United States Patent
Zurmehly et al.

(10) Patent No.: US 10,605,086 B2
(45) Date of Patent: Mar. 31, 2020

(54) TURBINE ENGINES WITH CERAMIC VANES AND METHODS FOR MANUFACTURING THE SAME

(71) Applicant: HONEYWELL INTERNATIONAL INC., Morristown, NJ (US)

(72) Inventors: George E. Zurmehly, Phoenix, AZ (US); Milton Ortiz, Scottsdale, AZ (US); Kin Poon, Tempe, AZ (US); Michael Vinup, Gilbert, AZ (US); Ardeshir Riahi, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1381 days.

(21) Appl. No.: 13/681,675

(22) Filed: Nov. 20, 2012

(65) Prior Publication Data

US 2014/0161623 A1 Jun. 12, 2014

(51) Int. Cl.
*F01D 5/12* (2006.01)
*F01D 5/14* (2006.01)
*F01D 5/28* (2006.01)

(52) U.S. Cl.
CPC ............. *F01D 5/12* (2013.01); *F01D 5/147* (2013.01); *F01D 5/284* (2013.01);
(Continued)

(58) Field of Classification Search
CPC . F01D 9/042; F01D 9/041; F01D 9/04; F01D 5/147; F01D 5/18; F01D 5/189; F01D 5/284; F01D 5/3069
See application file for complete search history.

(56) References Cited

U.S. PATENT DOCUMENTS 3,443,792 A 5/1969 Moss
4,017,209 A 4/1977 Bodman
(Continued)

FOREIGN PATENT DOCUMENTS

DE 3539903 A1 5/1987
EP 2039884 A1 3/2009
(Continued)

OTHER PUBLICATIONS

EP Examination Report for Application No. 13183825.2 dated Jun. 13, 2017.
(Continued)

*Primary Examiner* — Carlos A Rivera
*Assistant Examiner* — Cameron A Corday
(74) *Attorney, Agent, or Firm* — Lorenz & Kopf, LLP

(57) ABSTRACT

A vane assembly includes first and second annular metal rings configured to accept a compressed gas flow therebetween. The first and second annular rings each include a cutout portion. The assembly further includes a ceramic matrix composite vane configured as an airfoil having a blunt rounded nose and a flattened and tapered tail. A first radial end of the vane is rigidly disposed on the first annular ring and a second radial end of the vane is slidably disposed within the cutout portion of the second annular ring such that the vane is encompassed by the first and second annular rings. The vane includes a hollow through opening portion extending radially therethrough. Still further, the assembly includes a metallic elongated member disposed within and extending through the hollow portion of vane and through the cutout portion of the first annular ring.

15 Claims, 4 Drawing Sheets

(52) U.S. Cl.
CPC ..... *F05D 2300/6033* (2013.01); *Y02T 50/672* (2013.01); *Y02T 50/673* (2013.01); *Y10T 29/49316* (2015.01)

(56) References Cited

U.S. PATENT DOCUMENTS

| | | | |
|---|---|---|---|
| 4,260,327 | A | 4/1981 | Armor et al. |
| 4,285,634 | A | 8/1981 | Rossman et al. |
| 4,312,599 | A | 1/1982 | Darolia |
| 4,376,004 | A | 3/1983 | Bratton et al. |
| 4,396,349 | A | 8/1983 | Hueber |
| 4,645,421 | A | 2/1987 | Huether |
| 4,790,721 | A | 12/1988 | Morris et al. |
| 4,987,944 | A | 1/1991 | Parks |
| 5,493,855 | A * | 2/1996 | Walters ............ F01D 5/187 415/173.1 |
| 5,630,700 | A * | 5/1997 | Olsen ............ F01D 5/189 415/134 |
| 5,704,762 | A | 1/1998 | Schultze |
| 6,000,906 | A | 12/1999 | Draskovich |
| 7,104,756 | B2 | 9/2006 | Harding et al. |
| 7,326,030 | B2 * | 2/2008 | Albrecht ............ F01D 5/147 415/115 |
| 7,393,182 | B2 | 7/2008 | Matheny |
| 7,410,342 | B2 | 8/2008 | Matheny |
| 7,762,781 | B1 * | 7/2010 | Brown ............ F01D 5/147 416/193 A |
| 7,857,588 | B2 | 12/2010 | Propheter-Hinckley et al. |
| 7,918,647 | B1 | 4/2011 | Liang |
| 8,100,653 | B2 | 1/2012 | Gerakis et al. |
| 8,133,009 | B2 | 3/2012 | Salvesen |
| 2003/0002979 | A1 | 1/2003 | Koschier |
| 2010/0068034 | A1 * | 3/2010 | Schiavo ............ F01D 5/189 415/115 |

FOREIGN PATENT DOCUMENTS

| | | |
|---|---|---|
| JP | H08226304 A | 9/1996 |
| RU | 2204020 C2 | 5/2003 |

OTHER PUBLICATIONS

European Search Report for Application No. 13183825.2-1610 / 2733308 dated May 23, 2017.

* cited by examiner

TURBINE ENGINES WITH CERAMIC VANES AND METHODS FOR MANUFACTURING THE SAME

STATEMENT REGARDING FEDERALLY SPONSORED RESEARCH OR DEVELOPMENT

This invention was made with Government support under NNX11CA49C awarded by NASA. The Government has certain rights in the invention.

TECHNICAL FIELD

The present disclosure relates generally to turbine engines and methods for manufacturing turbine engines. More particularly, the present disclosure relates to turbine engines with ceramic vanes and methods for manufacturing turbine engines with ceramic vanes.

BACKGROUND

Turbine engines include a compressor assembly, a combustor assembly, and a turbine assembly. The compressor compresses ambient air, which is channeled into the combustor where it is mixed with fuel and burned, creating a heated working gas. The working gas can reach temperatures of about 2000-3000° F., and is expanded through the turbine assembly. The turbine assembly has a series of circular arrays of rotating blades attached to a central rotating shaft. A circular array of stationary vanes is mounted in the turbine casing just upstream of each array of rotating blades. The stationary vanes are airfoils that redirect the gas flow for optimum aerodynamic effect on the next array of rotating blades. Expansion of the working gas through the rows of rotating blades and stationary vanes causes a transfer of energy from the working gas to the rotating assembly, causing rotation of the shaft, which drives the compressor.

The vane assemblies may include an outer platform element or shroud segment connected to one end of the vane and attached to the turbine casing, and an inner platform element connected to an opposite end of the vane. The outer platform elements are positioned adjacent to each other to define an outer shroud ring, and the inner platform elements may be located adjacent to each other to define an inner shroud ring. The outer and inner shroud rings define an annular working gas flow channel between them.

Vane assemblies may have passageways for a cooling fluid such as air. The coolant may be routed from an outer plenum, through the vane, and into an inner plenum attached to the inner platform elements. The vanes are subject to mechanical loads from aerodynamic forces on them while acting as cantilever supports for the inner platform elements and inner plenum. Thus, problems arise in assembling vanes with both the required mechanical strength and thermal endurance.

Attempts have been made to form vane platforms and vane cores of metal with a ceramic matrix composite (hereinafter "CMC") cover layer. However, ceramic materials present certain problems that have heretofore prohibited their widespread use for constructing part or all of the vane. Firstly, ceramic materials do not have the tensile strength of metallic materials. Secondly, due to its usually relatively low ductility, ceramic material has a tendency to crack under the impact of severe or suddenly applied thermal shock or stresses such as may occur in advanced lightweight aircraft gas turbines. Thirdly, where it is desired to strengthen the blade or vane structurally, such as by means of metallic body or strut member or members, the dissimilar characteristics of the metal body and the ceramic materials in the areas of ductility, thermal conductivity, and brittleness, for example, create additional problems concerning how to mate these materials in an integral airfoil construction.

Furthermore, forming CMC airfoils, such as by wet layering on a metal core, is unsatisfactory, because curing of CMC requires temperatures that damage metal. Also CMC has a different coefficient of thermal expansion than metal, resulting in separation of the airfoil from the metal during turbine operation. CMC or superalloy airfoils may be formed separately and then assembled over the metal core, but this involves problems with assembly. If an inner and outer platform and vane core are cast integrally, there is no way to slide CMC cover elements over them. Thus, attempts have been made to form CMC airfoils split into halves, connecting the halves over the vane core. However, this results in a ceramic seam, which must be cured in a separate high-temperature step that can damage metal and may cause lines of weakness in the airfoil. If the platforms and vane are cast separately it is challenging to mechanically connect them securely enough to withstand the cantilevered aerodynamic forces and vibrational accelerations. It is also challenging to mount a CMC airfoil over a metal vane core securely in a way that accommodates differential thermal expansion without allowing vibration.

Accordingly, there is a need for improved turbine engines with CMC vanes and methods for manufacturing the same. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Turbine engines with ceramic vanes and methods for manufacturing turbine engines with ceramic vanes are disclosed herein. In one exemplary embodiment, vane assembly includes first and second annular metal rings configured to accept a compressed gas flow therebetween. The first and second annular rings each include a cutout portion. The assembly further includes a ceramic matrix composite vane configured as an airfoil having a blunt rounded nose and a flattened and tapered tail. A first radial end of the vane is rigidly disposed on the first annular ring and a second radial end of the vane is slidably disposed within the cutout portion of the second annular ring such that the vane is encompassed by the first and second annular rings. The vane includes a hollow through opening portion extending radially therethrough. Still further, the assembly includes a metallic elongated member disposed within and extending through the hollow portion of vane and through the cutout portion of the first annular ring. The elongated member is held in position between a first attachment portion disposed radially inward from the first annular ring and coupled thereto and a second attachment portion disposed radially outward from the second annular ring and coupled thereto. The elongated member accepts an axial load from the vane, but does not transfer any radial load to or from the vane.

In another exemplary embodiment, a vane assembly includes first and second concentric rings configured to accept a compressed gas flow therebetween. The first ring includes a cutout portion and the second ring includes a cutout portion. The vane assembly also includes a vane configured as an airfoil. A first radial end of the vane is rigidly disposed on the first ring and a second radial end of the vane is slidably disposed within the cutout portion of the second ring. The vane includes a hollow portion extending radially therethrough. Still further, the assembly includes an elongated member disposed within and extending through the hollow portion of vane. The elongated member accepts an axial load from the vane, but does not transfer any radial load to or from the vane. Additionally, the elongated member does not provide any clamping force between the first and second rings, thereby avoiding any compressive radial loads on the vane.

In yet another exemplary embodiment, a method of manufacturing a vane assembly includes disposing a first axial end of a ceramic metal composite vane configured as an airfoil having a blunt rounded nose and a flattened and tapered tail on a first annular metal ring, disposing a second annular ring on a second axial end of the vane, radially sliding the second axial end of the vane through a cutout portion of the second annular ring, and inserting a metallic elongated member within a hollow portion of the vane so as to extend therethrough and so as to further extend through a cutout portion of the first annular ring. The elongated member accepts an axial load from the vane, but does not transfer any radial load to or from the vane.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The inventive subject matter will hereinafter be described in conjunction with the following drawing figures, wherein like numerals denote like elements, and wherein.

DETAILED DESCRIPTION

Figure 1:
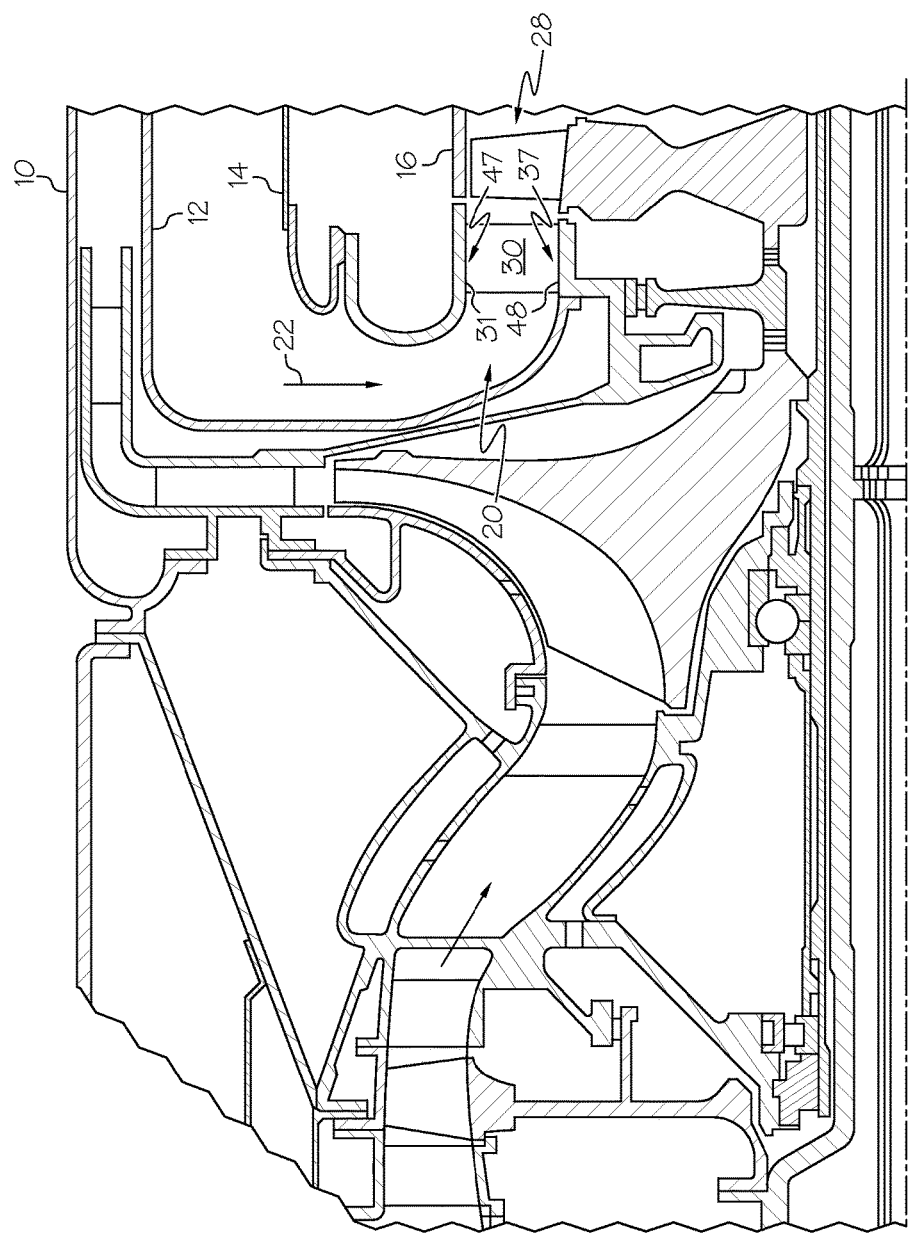
FIG. 1 is a cross-sectional illustration of an axial flow turbine engine according to an embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. Furthermore, as used herein, numerical ordinals such as "first," "second," "third," etc., such as first, second, and third components, simply denote different singles of a plurality unless specifically defined by language in the appended claims. All of the embodiments and implementations of the vane assemblies and methods for the manufacture thereof described herein are exemplary embodiments provided to enable persons skilled in the art to make or use the invention and not to limit the scope of the invention, which is defined by the claims. Furthermore, there is no intention to be bound by any expressed or implied theory presented in the preceding technical field, background, brief summary, or the following detailed description.

Embodiments of the present disclosure describe improved turbine engines with CMC vanes and methods for manufacturing such turbine engines. Broadly speaking, a turbine engine vane assembly includes a metallic, annular inner ring and a metallic, annular outer ring, with a plurality of CMC vanes extending radially between the inner ring and the outer ring. During the manufacturing process, a CMC vane is disposed on the inner ring, and then the outer ring is disposed on the radially outward end of the CMC vane, such as an extension portion of the CMC vane. The outer ring includes a plurality of cutouts corresponding generally to the shape of the extension portion of the CMC vane, and the CMC vane extension portion is slid radially through one of the cutouts in the outer ring. The CMC vane has an interior portion that is hollow, and an elongated metallic member, such as a metallic rod, is inserted into the hollow interior portion of the CMC vane. The elongated metallic member is provided to transfer an axially oriented mechanical load (such as airflow impingement axially against the vanes) from the CMC vanes to the metallic inner and outer rings. The elongated metallic member, however, does not prevent the CMC vanes from sliding (i.e., expanding or contracting) radially therealong, and as such does not provide any radially oriented mechanical load to (either compressive or tensile) or accept any radial load from the CMC vane.

As such, embodiments of the present disclosure beneficially allow the CMC vanes to thermally expand/contract relative to the outer ring, without the outer ring (or the inner ring) imparting excessive radial loads on the CMC vanes. The CMC vanes are beneficially supported by the elongated member against axially loading, for example as the result of hot gas flow. In this manner, compressive and tensile loads are substantially avoided on the CMC vanes, which is anticipated to increase the life expectancy, improve the durability, and reduce fatigue cracking thereof. An exemplary embodiment of the present disclosure is discussed in greater detail, below.

In an embodiment, and turning now specifically to FIG. 1, shown is a portion of the turbine section of a typical engine. An outer casing member 10, an outer liner member 12, an inner liner member 14, and an inner casing member 16 are provided. The outer and inner liner members 12 and 14 form an annular combustor having a discharge passage or turbine nozzle inlet area, indicated generally at 20. The large arrow 22 depicts the direction of the main flow of hot combustion gas as it enters the turbine nozzle or diaphragm. The turbine nozzle includes a plurality of radially extending vanes 30, such as CMC vanes, including an inner end wall 37 and an outer end wall 47. After the hot gas flow is turned in the proper direction by the vanes, it impinges upon and rotates a bladed turbine rotor wheel, indicated generally at 28, wherein the energy is extracted from the gas flow. The illustrated turbine engine includes an annular ring or row of vanes 30 for vectoring hot combustion air to the turbine. Each individual vane assembly can be of a substantially identical construction to maintain uniform air flow. It will be appreciated that although the turbine section shown in FIG. 1 depicts a "reverse flow burner" configuration, embodiment of the present disclosure will be equally applicable to "axial through-flow burner" configurations, as well as other configurations known in the art. Further, it will be appreciated that although the turbine section shown in FIG. 1 depicts a first stage turbine vane, embodiments of the present disclosure will be equally applicable to all stages of vanes downstream of the combustor.

Figure 2:
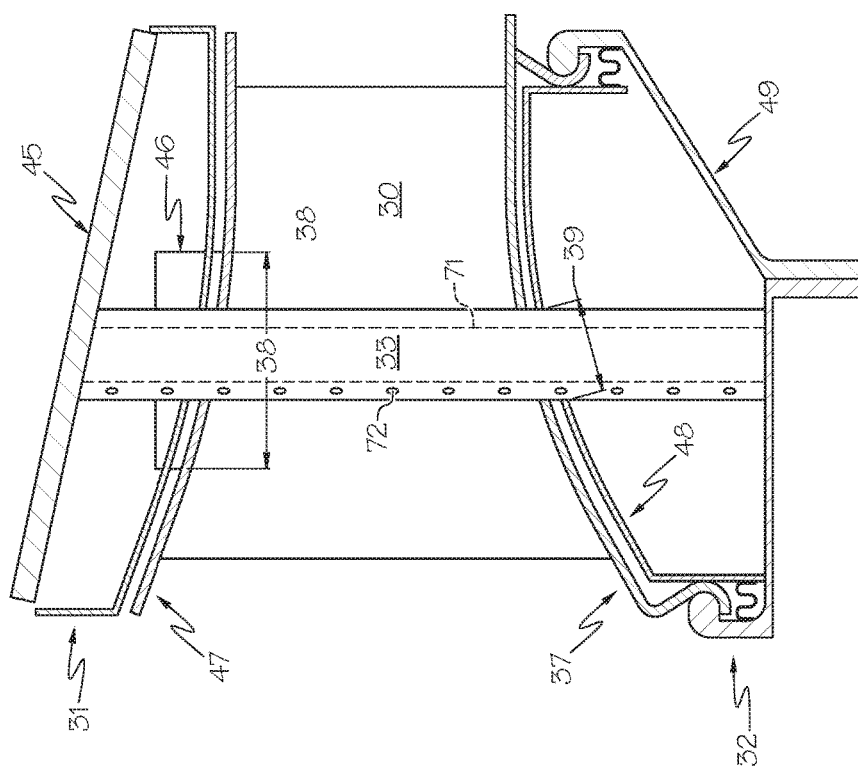
FIG. 2 is a cross-sectional illustration of a vane assembly according to an embodiment.
Figure 3:
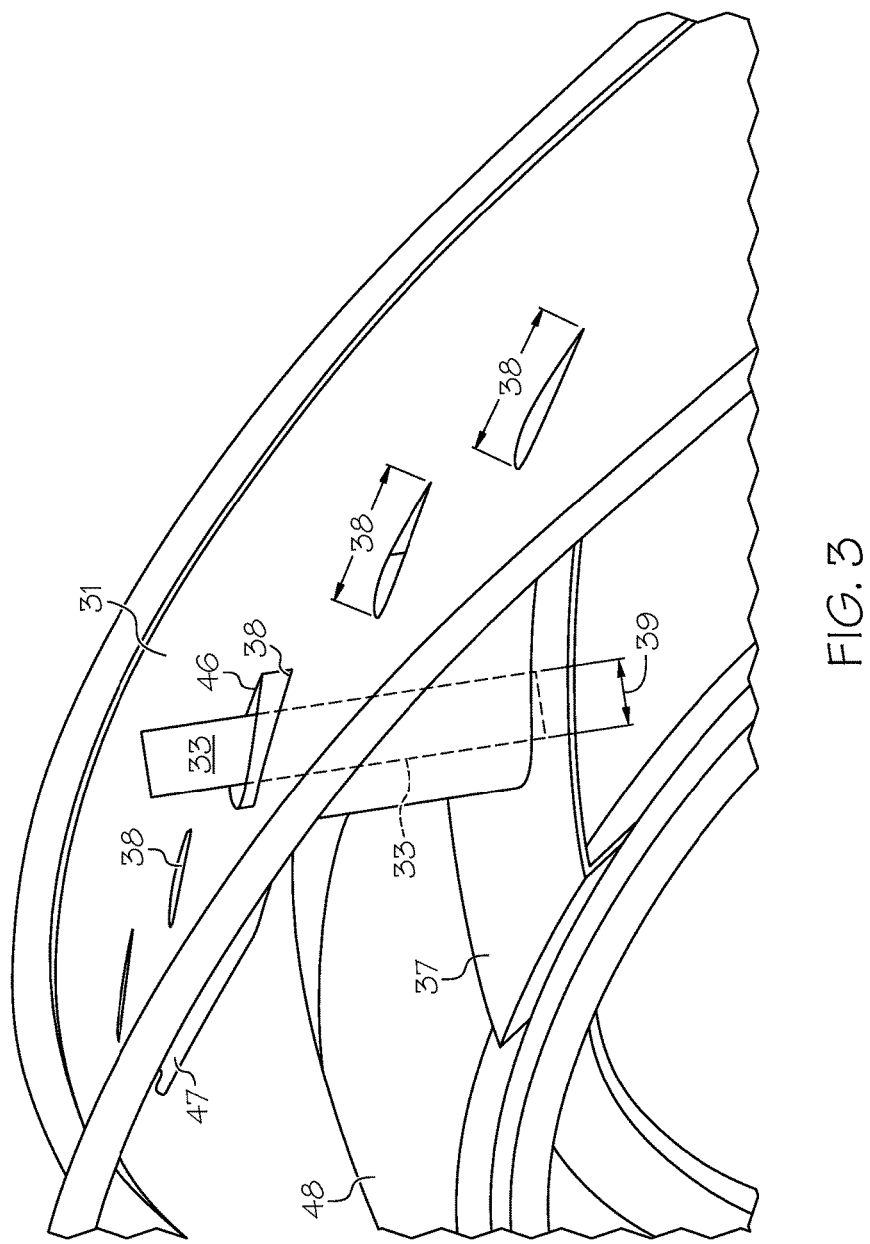
FIG. 3 is perspective illustration of the mounting of a vane on a vane assembly according to an embodiment.

Referring now to FIGS. 2 and 3, which respectively show an exemplary vane assembly in cross-section and perspective view, a first (outer) metallic, annular shroud ring 31 is disposed concentrically with a second (inner) metallic, annular shroud ring 48. The metallic annular shroud rings 31 and 48 may be formed of a nickel superalloy, for example. The two rings 31 and 48 house the vane 30 therebetween. The vane 30 is configured as an airfoil having a blunt rounded nose and a flattened and tapered tail. Each vane 30 also has a hollow portion, such as a through opening, extending through a radial axis thereof and between the annular shroud rings 31 and 48 for receiving and retaining a rigid elongated member, such as a rod 33, therethrough. Optionally, the through opening of the vane 30 can be shielded or jacketed with a metal sleeve, and the elongated member such as the rod 33 can be inserted within the metal sleeve located within the vane 30.

Various examples of CMC vanes are known in the art, and as such the exemplary CMC vane described in brief below is intended to serve on as a non-limiting example. The CMC vane 30 may be formed from a metallic inner core, a laminate layer, and a thermal barrier coating. The laminate layer may be, but is not limited to being, a ceramic matrix composite material having an outer surface defining the CMC vane 30. The ceramic matrix composite may be any fiber reinforced ceramic matrix material or other appropriate material. The fibers and matrix material surrounding the fibers may be oxide ceramics or non-oxide ceramics, or any combination thereof. The ceramic matrix fibers may combine a matrix material with a reinforcing phase of a different composition, such as, but not limited to, mullite/silica, or of the same composition, such as, but not limited to, alumina/alumina or silicon carbide/silicon carbide. Typically, the ceramic material used for each vane 30 is selected to resist heat and erosion common to metal blades. Further, the vane 30 can be designed to resist operational difficulties such as to resist heat and erosion common to metal blades. Each vane 30 can include a thicker elliptical portion which tapers into a thinner curved portion. The elliptical portion of the vane 30 can include the opening for receiving the rod 33.

The two shroud rings 31 and 48 can contain one or more CMC vanes 30. Each such CMC vane 30 includes an inner end wall 37 and an outer end wall 47. The inner and outer end walls 37, 47 conform generally to the (curved) shape of the inner and outer shroud rings 48, 31, respectively. In this manner, the two shroud rings 31 and 48 act as impingement plates to control the temperature of the CMC vane end walls 47, 37, respectively. Each such CMC vane 30 further includes an extension portion 46, which extends radially outward from the outer end wall 47, and may include a portion of the through opening for the elongated member 33.

To position CMC vanes 30, a CMC vane is first disposed on the inner shroud ring 48. The inner ring 48 contains each CMC vane 30 thereon in a predetermined fixed relation relative to the engine's longitudinal axis (parallel to the air flow path through the engine). The predetermined fixed relation of the CMC vane 30 relative to the engine's longitudinal axis is determined by the configuration of its corresponding attachment portions 32 and 49, as illustrated particularly in FIG. 2.

Once the CMC vane 30 is fixed into position along the inner shroud ring 48, the outer shroud ring 31 is positioned thereover and the extension portion 46 of the CMC vane 30 is slid through a cutout 38 in the outer shroud ring 31. The cutout portion 38 corresponds to the shape of the extension portion 46. Attachment portions 32, 49 couple with opposite longitudinal ends of the inner end wall 37 to hold the CMC vane 30 in a fixed position along the inner shroud ring 48. In this manner, the CMC vane 30 is now disposed between the inner and outer shroud rings 48, 31.

Thereafter, an elongated member, such as rod 33, is slidably inserted into the through opening of the vane 30, which as noted above extends through the entire radial length of the CMC vane 30. The rod 33 exits the CMC vane 30 and continues through a cutout portion in the inner shroud ring 48. As such, it will be appreciated that during the above-described positioning step of the CMC vane 30, the through opening should be positioned directly over a cutout portion of the inner shroud ring 48 so as to allow for insertion of the rod 33 therethrough. The rod 33 is supported at its inner radial end be attachment portion 32. Further, the rod 33 is then supported at its outer radial end by a further attachment portion 45 that is coupled with the outer shroud ring 31.

As shown in perspective in FIG. 3, the CMC vane 30 is mounted on a radially outer surface of the inner ring 48. The CMC vane extension portion 46 is slid radially through a cutout 38 of the outer ring 31. The rigid elongated member, for example rod 33, is inserted into the hollow through opening of the CMC vane 30. The rod 33 mechanically couples with the metallic attachment portions 32, 45 (not visible in FIG. 3) as noted above, and thereby provides axial support to the vane 30. That is, the rod 33 is configured to accept an axially oriented mechanical load from the vane 30, such as the force generated by hot air impinging thereon, and transfer such load to the metallic attachment structures coupled to the structures 31 and 32.

However, as the elongated member (e.g., rod 33) is merely slid into the hollow through opening of the vane 30, and not rigidly coupled in any way thereto, the elongated member does not provide any radial loading to, or accept any radial loading from, the CMC vane 30. Nor does the elongated member provide any clamping force between rings 31 and 32 (so as to indirectly place a compressive load on the vane 30). Rather, as the temperature of the vane assembly increases/decreases, it will be appreciated that the CMC vane 30 is allowed to slide radially with respect to the rod 33 (and within the cutout 38 of the outer ring 31), due to the different coefficients of thermal expansion of the CMC vane 30 and the metallic rings 48 and 31, respectively. In this manner, compressive and tensile loads are substantially avoided on the CMC vane 30, which is anticipated to increase the life expectancy, improve the durability, and reduce fatigue cracking thereof.

In a further, optional aspect of the present disclosure, the rod 33 may be configured so as to deliver a cooling fluid flow to the CMC vane 30, such as cooling air flow. In an embodiment, cooling air may be delivered from a plenum and into a hollow inner portion of the rod 33. The cooling air travels through rod 33, inserted into the CMC vane 30, wherein the cooling air is distributed into the CMC vane 30 via one or more openings, such as pin holes in the rod 33. Thereafter, the cooling air may flow throughout the CMC vane via a cooling air circuit formed therein (as is known in the art), exiting out one or more vent holes at the trailing, curved portion of the CMC vane 30 and/or through effusion holes in the vane 30.

Figure 4:
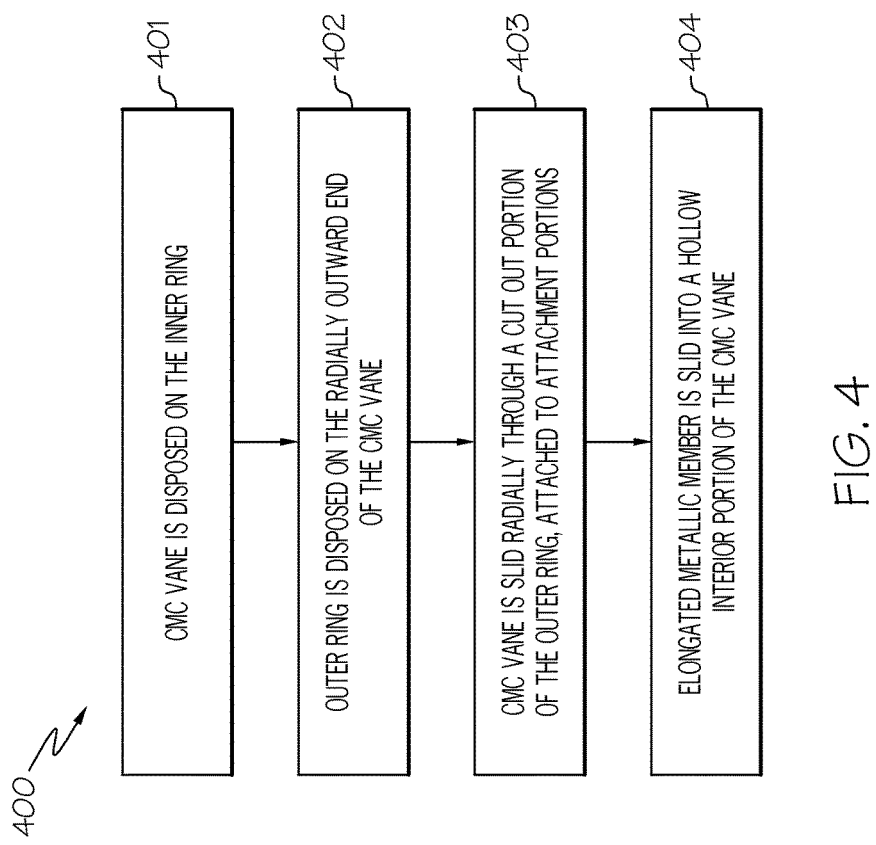
FIG. 4 is an exemplary method of manufacturing a vane assembly according to an embodiment.

FIG. 4 is a flowchart illustrating a method 400 in accordance with an embodiment of the present disclosure for manufacturing a CMC vane assembly. During the manufacturing process 400, at a first step 401, a CMC vane is disposed on the inner ring. At step 402, the outer ring is disposed on the radially outward end (extension portion) of the CMC vane. The outer ring includes a plurality of cutouts corresponding generally to the shape of the extension portion of the CMC vane. At step 403, the CMC vane is slid radially through one of the cutouts in the outer ring. Once the CMC vane is slid through the cutout, it is slid radially outward and attached to the attachment portions (e.g., 32, 49 as shown in the figures), such that the vane is positioned relative to the engine centerline. The CMC vane has an interior portion that is a hollow through opening, and at step 404, an elongated metallic member, such as a metallic rod, is inserted into the hollow interior portion of the CMC vane, and through a cutout portion of the inner ring.

The above-described embodiment is an improvement over the state of the art, as the elongated metallic member is provided to transfer an axially oriented mechanical load (such as airflow impingement axially against the vanes) from the CMC vanes to the metallic inner and outer rings, or other structures supporting the rings, but not prevent the CMC vanes from sliding (i.e., expanding or contracting) radially therealong. As such, the elongated member does not provide any radially oriented mechanical load to (either compressive or tensile) or accept any radial load from the CMC vane. Further, the rod does not provide any clamping force between the inner and outer rings.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

The invention claimed is:

1. A vane assembly comprising:
    first and second annular metal rings configured to accept a compressed gas flow therebetween, wherein the first and second annular rings each include a cutout portion;
    a ceramic matrix composite (CMC) vane configured as an airfoil having a blunt rounded nose and a flattened and tapered tail, wherein a first radial end of the CMC vane is rigidly disposed on the first annular ring but not into the cutout portion of the first annular ring and a second radial end of the CMC vane is slidably disposed within and through the cutout portion of the second annular ring such that the CMC vane is encompassed by the first and second annular rings, wherein the CMC vane is freely slidable within the cutout portion of the second annular ring in the radial direction, wherein the CMC vane includes a hollow through opening portion extending radially therethrough, wherein the second radial end of the CMC vane comprises an extension portion, wherein the extension portion has a cross-sectional area in the plane perpendicular to the radial direction that is smaller in area as compared to the cross-sectional area of the CMC vane taken in the plane perpendicular to the radial direction, and wherein the extension portion is configured to fit within the cutout portion of the second annular ring; and
    a metallic elongated member disposed within and extending through the hollow portion of the CMC vane and through the cutout portion of the first annular ring, wherein the elongated member is held in position between a first attachment portion disposed radially inward from the first annular ring and coupled thereto and a second attachment portion disposed radially outward from the second annular ring and coupled thereto, wherein the elongated member extends radially outward beyond the second radial end of the CMC vane to couple with the second attachment portion,
    wherein the elongated member is capable of accepting an axial load from the CMC vane when an external force impinges axially against the CMC vane, but wherein the elongated member remains free to slide radially along the CMC vane and is not rigidly coupled to the CMC vane.

2. The vane assembly of claim 1, wherein upon thermal expansion or contraction of the CMC vane, the CMC vane moves radially relative to the elongated member.

3. The vane assembly of claim 1, wherein the elongated member is a metallic rod.

4. The vane assembly of claim 3, wherein the rod includes a hollow portion to allow cooling air to flow therethrough.

5. The vane assembly of claim 4, wherein the rod includes a plurality of openings along its length to allow the cooling air to enter into the hollow portion of the CMC vane.

6. The vane assembly of claim 1, comprising a plurality of CMC vanes disposed between the first annular ring and the second annular ring.

7. The vane assembly of claim 1, wherein the cutout portion of the second ring and a radial cross section of an extension portion of the CMC vane have corresponding shapes.

8. The vane assembly of claim 1, wherein the axial load is provided by compressed air flow impinging axially against the CMC vane.

9. The vane assembly of claim 1, wherein the elongated member does not provide any clamping force between the first and second rings, thereby avoiding any compressive radial loads on the CMC vane.

10. The vane assembly of claim 1, wherein the first and second annular rings are comprised of a nickel superalloy.

11. The vane assembly of claim 1, wherein the elongated member is configured to fit within and through the extension portion.

12. A vane assembly comprising:
    first and second concentric rings configured to accept a compressed gas flow therebetween, wherein the first ring includes a cutout portion and the second ring includes a cutout portion, wherein the cutout portion of the second ring is larger in area than the cutout portion of the first ring, and wherein the first ring is coupled to and supported by a first attachment portion disposed radially inward from the first ring and the second ring is coupled to and supported by a second attachment portion disposed radially outward from the second ring;
    a ceramic matrix composite (CMC) vane configured as an airfoil, wherein a first radial end of the CMC vane is rigidly disposed on the first ring but not into the cutout portion of the first ring and a second radial end of the CMC vane is slidably disposed within and through the cutout portion of the second ring without contacting the second attachment portion, wherein the CMC vane is freely slidable within the cutout portion of the second annular ring in the radial direction, wherein the CMC vane includes a hollow portion extending radially therethrough, wherein the second radial end of the CMC vane comprises an extension portion, wherein the extension portion has a cross-sectional area in the plane perpendicular to the radial direction that is smaller in area as compared to the cross-sectional area of the CMC vane taken in the plane perpendicular to the radial direction, and wherein the extension portion is configured to fit within the cutout portion of the second annular ring; and an elongated member disposed within and extending through the hollow portion of the CMC vane, and also extending through the cutout portion of the first ring so as to contact with the first attachment portion and extending through the cutout portion of the second ring radially outward beyond the second radial end of the CMC vane so as to contact with the second attachment portion, wherein the elongated member is capable of accepting an axial load from the CMC vane when an external force impinges axially against the CMC vane, but wherein the elongated member remains free to slide radially along the CMC vane and is not rigidly coupled to the CMC vane, and wherein the elongated member does not provide any clamping force between the first and second rings, thereby avoiding any compressive radial loads on the CMC vane.

13. The vane assembly of claim 12, wherein the first and second rings are comprised of a metal.

14. The vane assembly of claim 12, wherein the elongated member is comprised of a metal.

15. The vane assembly of claim 12, wherein the axial load is provided by compressed air flow impinging axially against the CMC vane.

\* \* \* \* \*